United States Patent
Mosimann

(10) Patent No.: US 6,495,937 B2
(45) Date of Patent: Dec. 17, 2002

(54) BRUSHLESS ELECTRIC MACHINE WITH MEANS FOR DETECTING THE ANGULAR POSITION OF THE ROTOR

(75) Inventor: Vincent Mosimann, La Neuveville (CH)

(73) Assignee: Bien-Air S.A., Bienne (CH)

( * ) Notice: Subject to any disclaimer, the term of this patent is extended or adjusted under 35 U.S.C. 154(b) by 0 days.

(21) Appl. No.: 09/726,016

(22) Filed: Nov. 30, 2000

(65) Prior Publication Data

US 2001/0004173 A1 Jun. 21, 2001

(30) Foreign Application Priority Data

Dec. 15, 1999 (EP) .............................. 99125017

(51) Int. Cl.[7] .............................. H02K 29/12; H02P 6/18
(52) U.S. Cl. .............................. 310/68 B; 310/156.28; 310/261
(58) Field of Search .......................... 310/68 B, 156.28, 310/156.29, 156.12, 156.31, 261, 262; 324/200

(56) References Cited

U.S. PATENT DOCUMENTS

| | | | | |
|---|---|---|---|---|
| 3,743,873 A | * | 7/1973 | de Jong .................... 310/156 |
| 4,562,399 A | * | 12/1985 | Fisher ....................... 310/111 |
| 4,748,359 A | * | 5/1988 | Yahara et al. ........... 310/156.13 |
| 4,864,174 A | * | 9/1989 | Kawamura et al. ........... 290/52 |
| 5,170,085 A | * | 12/1992 | Shinto .................... 310/156.28 |
| 5,256,923 A | | 10/1993 | Bartos et al. .............. 310/68 B |
| 5,485,045 A | * | 1/1996 | Canders et al. ................ 29/598 |
| 5,744,894 A | * | 4/1998 | Cho et al. .................... 310/261 |
| 5,796,195 A | | 8/1998 | Miyakawa ................... 310/166 |
| 5,912,521 A | * | 6/1999 | Ray ............................. 310/156 |
| 5,990,588 A | * | 11/1999 | Kliman et al. ................. 310/86 |

FOREIGN PATENT DOCUMENTS

| | | |
|---|---|---|
| EP | 234 663 | 9/1987 |
| EP | 720 283 | 7/1996 |
| WO | 99 09645 | 2/1999 |

* cited by examiner

*Primary Examiner*—Burton S. Mullins
(74) *Attorney, Agent, or Firm*—Sughrue Mion, PLLC

(57) ABSTRACT

In order to detect the angular position of a permanent magnet rotor (13) of a brushless motor, measuring means are connected to the windings of the stator in such a way as to form an oscillatory circuit and the variations in the frequency of resonance as a function of the position of rotor are measured. In order to augment these variations, the rotor has a non-magnetic structure (26) around the magnet (14) with zones of different thicknesses or of different permeabilities. This structure can be formed by a metal sleeve, of brass for example, having openings or recesses (44) which can be filled with a dielectric material.

35 Claims, 3 Drawing Sheets

Figure 1:
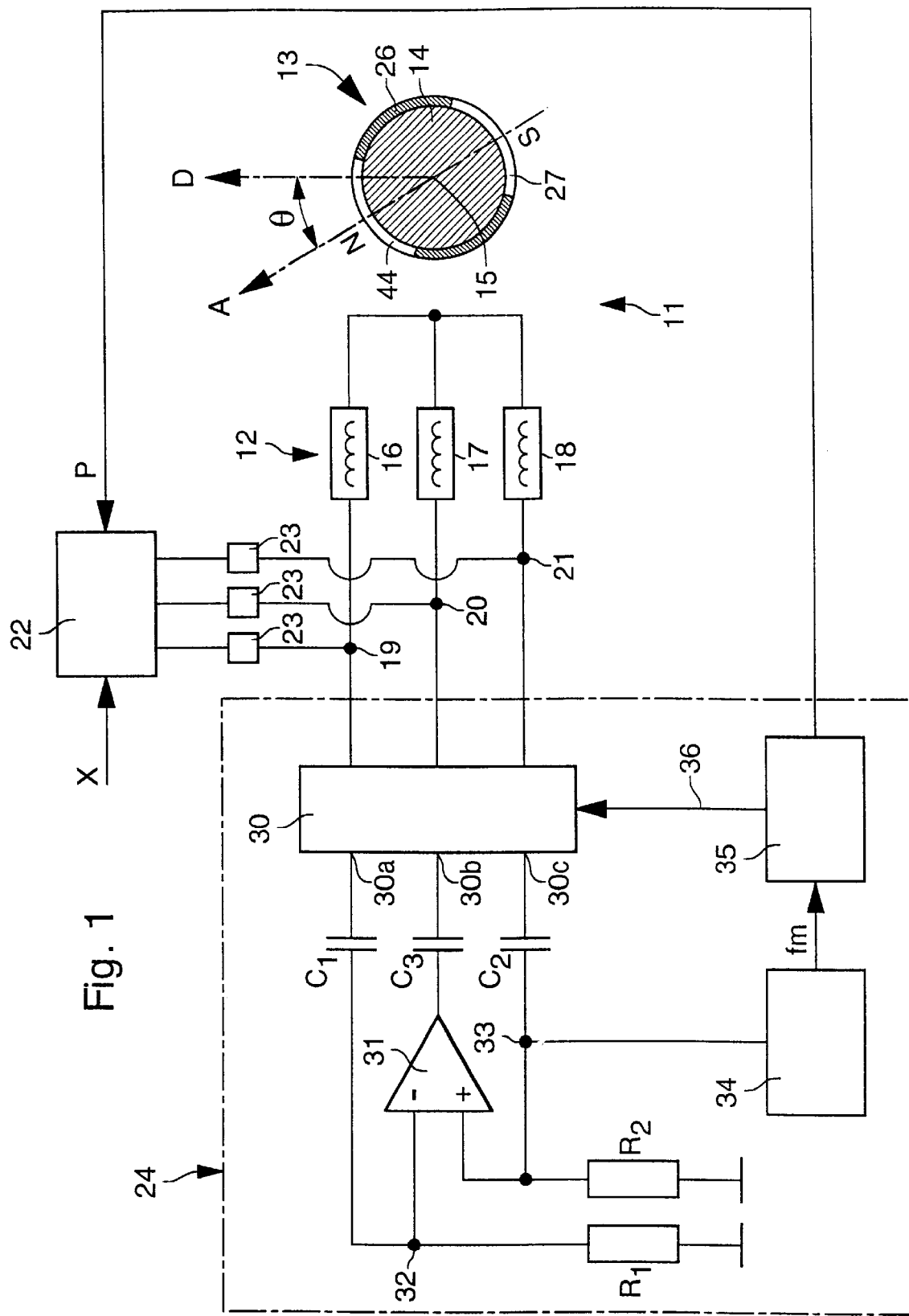

BRUSHLESS ELECTRIC MACHINE WITH MEANS FOR DETECTING THE ANGULAR POSITION OF THE ROTOR

The present invention relates to a brushless electric machine comprising a stator with polyphase windings, a rotor having at least one permanent magnet magnetised radially relative to the axis of the rotor and a non-magnetic structure at least partially surrounding the magnet, and means for detecting the angular position of the rotor.

The invention is especially applicable to detection of the angular position of the rotor for automatic control of the variable frequency and amplitude polyphase supply of synchronous, permanent magnet electric motors which are provided with structural parts indicating the position of the rotor, where this supply can be sinusoidal or by way of pulses of continuous current. Motors of this kind are preferred in certain fields of application, such as medical or dental instruments because, in view of the reduced dimensions of the instruments, it is necessary to reduce as much as possible the size of the motor and the number of connections between the motor and its control device.

The object of the automatic control is in particular to obtain maximum torque and to avoid the synchronous motor pulling out of sync. Especially at low speeds it should allow good control over the torque and the speed and allow execution of special cycles of work, operating over a small number of revolutions or over fractions of a revolution of the rotor.

The conventional automatic control devices which use magnetic Hall sensors or an angular encoder for example to indicate the position of the rotor suffer from the problems of some bulk in the motor as well as supplementary electric connections between the motor and its control device. Other known devices uses voltage transformers to detect variations in the impedance of the stator windings, but these heavy and bulky components are also a problem.

It is known to use high frequency voltages applied to the stator windings to detect variations in the impedance of these windings as a function of the position of the magnetic field of the rotor. For example the document JP 9-163788 A provides an estimate of the position of the rotor when stopped on the basis of three high frequency voltages measured on the three phases of the stator, in order to be able to control starting of the motor with maximum torque and efficiency.

However, the inventor has found that, when a stator winding is connected in series in an oscillatory circuit and the frequency of resonance of the this circuit is observed, the frequency varies because of variations in the impedance of the circuit, which are related in particular to variations in the magnetic flux of the rotor in the stator windings. The angular position of the rotor can be calculated on the basis of the variations in this frequency. In French patent application No. 98 09153, published after the date of the present application, the use of two oscillatory circuits having different frequencies is described, to calculate the angular position of the moving rotor and in consequence to control the supply pulses of the motor.

The inventor has found that a rotor fitted with a sintered permanent magnet by itself causes a variation of frequency of the order of 10% as a function of its angular position relative to the stator windings passing this frequency. This variation is attributed to the preferentially aligned molecular structure, i.e. the anisotropy, resulting from the manufacture of the magnet. Unfortunately the variation in frequency thus obtained is relatively weak and partially random. Although it can be used, this variation does not allow of great precision.

One object of the present invention is to improve an electric machine of the kind specified above, in such as way as to amplify the variation in the frequency of resonance of the oscillatory circuit and thus to allow easier and more precise detection of the angular position of the rotor, whether it is moving or stationary.

To this end the electric machine according to the invention is characterized in that the said non-magnetic structure has zones of different thicknesses or of different permeabilities around the circumference of the magnet.

In other words, the radial gap between the peripheral surface of the rotor magnet and the internal surface of the stator pole pieces, which comprises the air-gap and the said non-magnetic structure, provides conditions for the passage of the magnetic flux which are variable around the circumference of the rotor. These conditions depend on both the nature and the thickness of the layers present in this gap, including the air-gap.

The result is that the high frequency magnetic flux produced through the rotor by the stator windings by virtue of the oscillatory circuit varies with the angular position of the rotor, not only because of the nature of the magnet, but in addition because of the form of the non-magnetic structure surrounding it. Appropriate choice of the geometry of this structure relative to the poles of the magnet makes it possible to augment the desired effect. The said zones of different thicknesses or permeabilities are preferably disposed symmetrically relative to a plane perpendicular to the direction of magnetisation of the magnet and passing through the axis of the rotor.

In small motors of this kind it is well known to fit the rotor magnet within a sleeve of non-magnetic material, the purpose of which is above all to prevent the magnet blowing apart under the influence of centrifugal force. In medical applications, which in particular require sterilisation procedures, the metal which is used is generally brass, because of its ease in machining and its good resistance to corrosion. In one advantageous embodiment of the invention, the non-magnetic structure of the rotor comprises such a sleeve, having recesses which form openings or thinned parts of the sleeve. These recesses can advantageously be filled with a dielectric material, an epoxy resin for example.

It should be noted that an electric machine according to the invention may be either a motor, or a generator, or a machine able to operate in both modes.

In one advantageous embodiment the means for detecting the angular position of the rotor comprise measuring means arranged to be connected selectively to windings of the stator in such a manner as to form an oscillatory circuit and to detect variations in the frequency of resonance of the said oscillatory circuit. However, it is important to note that the principles of the present invention can also be used with other types of detecting means. In this respect the eddy currents induced in the metal sleeve of the rotor play a major role in the methods of detection to be employed.

Figure 2:
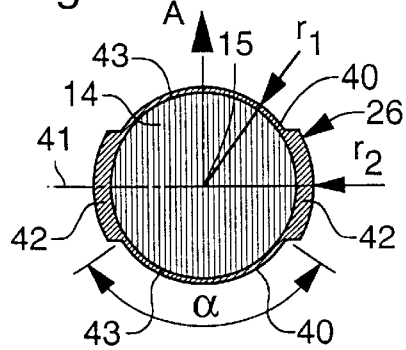
Figure 9:
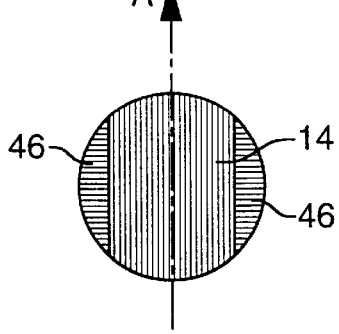
Figure 10:
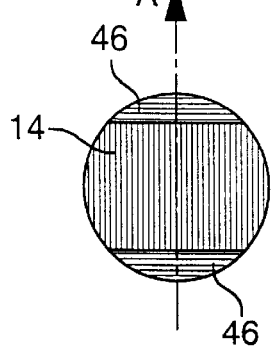
Figure 11:
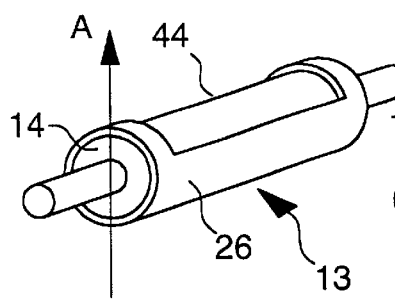
Figure 12:
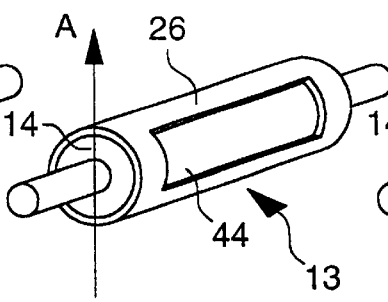
Figure 13:
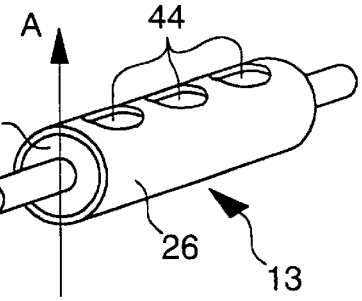
Figure 14:
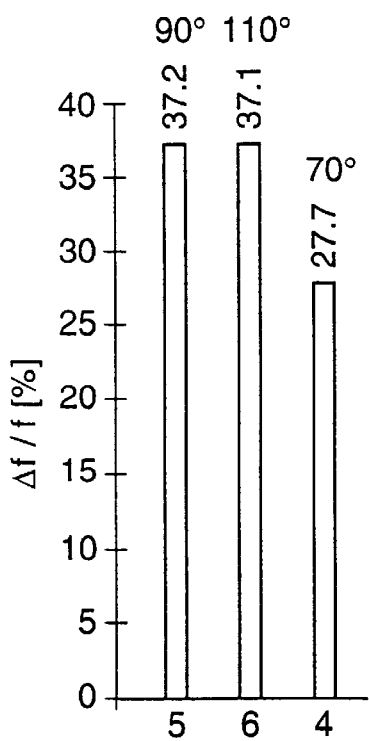
Figure 15:
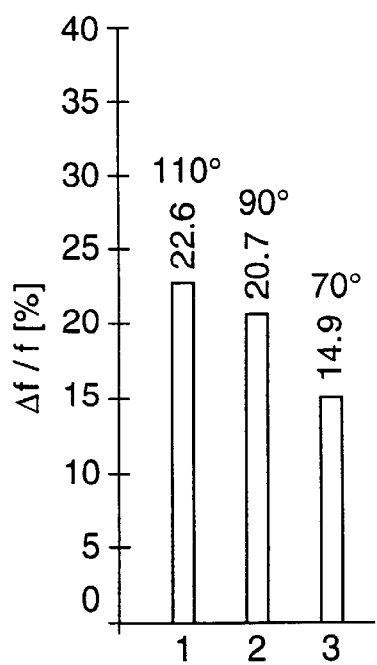
Figure 16:
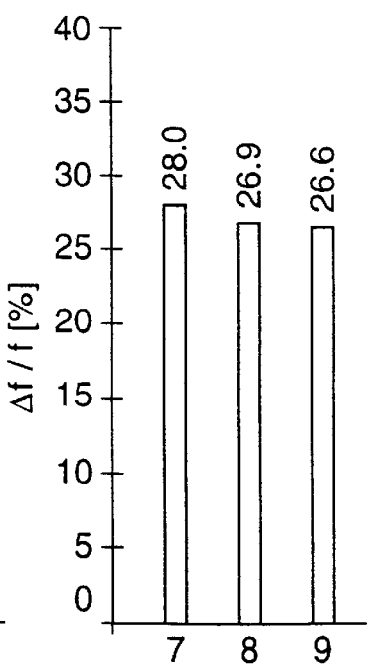

Other features and advantages of the invention will appear in the following description of various embodiments, with reference to the accompanying drawings, in which:

FIG. 1 is a schematic representation of a brushless electric motor according to the invention, with control means and means for detecting the angular position of its rotor, FIG. 2 is a schematic section of one embodiment of the rotor, FIGS. 3 to 10 are views like FIG. 2 and representing other embodiments of the rotor, FIGS. 11 to 13 show different configurations of the sleeve surrounding the rotor in perspective, and FIGS. 14 to 16 represent variations in the frequency obtained during tests of various rotors having the configurations according to FIGS. 11 to 13.

A brushless synchronous electric motor 11 is shown in FIG. 1, with a polyphase stator 12 and a rotor 13 with a permanent magnet 14, whose axis of rotation is indicated at 15. The stator 12 has three phase windings 16, 17 and 18, which are star or delta connected, their terminals 19, 20 and 21 being supplied through low pass filters 23 by a control circuit 22, which comprises a three-phase generator of voltages which are preferably sinusoidal. The filters 23 are arranged to block the high frequency band f described below. The control device 22 also comprises, in known manner, regulating means which allow the amplitude, frequency and phase of the supply voltages to be varied as a function of a set-point signal X provided by an operator, as will as a signal P which represents an angular position of the rotor 13. The signal P is provided by detecting means 24 for the angular position of the rotor.

The magnet 14 of the rotor 13 has radial magnetisation, represented by an axis of magnetisation A whose angular position at a given instant is represented by an angle θ which it makes with a reference direction D fixed relative to the stator. It is noted however that the present invention is equally applicable when the magnet 14 is multi-polar or if the rotor 13 comprises several magnets, with one or several axes of magnetisation, such as the axis A.

As will be described below, the rotor 13 comprises a non-magnetic structure 26 around the magnet 14, with zones of different thicknesses or of different magnetic permeabilities around the circumference of the magnet. In the example illustrated in FIG. 1, the non-magnetic structure 26 is formed by a sleeve of brass in which openings 44 are formed.

The detecting means 24 comprise a switching circuit 30 enabling its inputs 30a, 30b and 30c to be connected selectively to the terminals 19, 20 and 21 of the stator 12. A capacitor C1 and a resistor R1 are connected in series between the input 30a and earth and likewise a capacitor C2 and a resistor R2 are connected in series between the input 30c and earth. Furthermore the input 30b is connected through a capacitor C3 to the output of an operational amplifier 31, whose inverting input is connected to the junction 32 between C1 and R1 and whose non-inverting input is connected to the junction 33 between C2 and R2. The junction 33 is also connected to a circuit 34 measuring the frequency, which furnishes a measurement signal fm to calculating means 35, formed by a microprocessor for example. These means 35 are connected to the switching circuit 30 through a connection 36 to effect control and they further utilise the values of the signal fm to calculate the angular position θ of the rotor 13 and provide the signal P representing the position to the control device 22.

The calculating means 35 control the switching circuit 30 in such a way as to effect measuring cycles, each comprising a sequence of three successive switching states. The inputs 30a, 30b and 30c of the circuit 30 are thus connected respectively to the terminals 19, 20 and 21 in the first state, to the terminals 20, 21 and 19 in the second state and to the terminals 21, 19 and 20 in the third state. In each of these states the amplifier 31, the resistors R1 and R2, the capacitors C1, C2 and C3 and the inductances of the windings 16, 17 and 18 form an oscillatory circuit having a high frequency of resonance f. This depends in particular on the said inductances, which vary with the angular position θ of the magnetic field of the rotor. The duration of each cycle is very short, for example less than 48 μs, so that the angle θ and thus the frequency of resonance varies very little in the course of a cycle, or not at all if the rotor is stationary. This instantaneous frequency, measured by the circuit 34, is represented by the measurement signal fm.

The calculating means 35 thus receive three measurements of frequency fm1, fm2 and fm3 in each measurement cycle, corresponding to positions offset from one another by 120° of the switching of the stator windings. Two of these measurements are enough for the man skilled in the art to calculate the instantaneous angular position θ of the rotor while the third can serve as a check.

On the basis of the values of θ represented by the signal P, the automatic control means included in the control device 22 can calculate in particular the speed of the rotor and the phase lag between the rotating field and the rotor, in order to control the supply to the motor 11 as a function of these parameters and of the set-point signal X.

FIGS. 2 to 8 show different embodiments of the rotor 13, in which the non-magnetic structure surrounding the magnet 14 is formed by a metal sleeve 26, of brass for example. In practice the magnet is generally traversed by a central shaft of the rotor, i.e. it has a tubular form.

In the case of FIG. 2 the magnet 14 is cylindrical. The sleeve 26 has a cylindrical internal surface lying against the magnet. It has two recesses 40 on its external surface which extend over only a part of the thickness of the sleeve and each have an angular extension α. The two recesses 40 are symmetrical with one another relative to an axial plane 41 perpendicular to the direction of magnetisation A and passing through the axis 15 of the rotor. The recesses 40 thus establish two zones 42 of normal thickness and two zones 43 of reduced thickness, formed by the parts cut out of the sleeve, around the circumference of the sleeve 26. In other words, the external surface of the sleeve 26 has a maximum radius $r_2$ in the zones 42 and a smaller radius $r_1$ in the zones 43. If it is desired that the rotor should have a circular circumference, it is possible to fill each recess 40 with a material having a permeability equal to or greater than that of air and markedly less good than that of the sleeve 26. This material can strengthen the sleeve and be formed by an epoxy resin for example.

Figure 3:
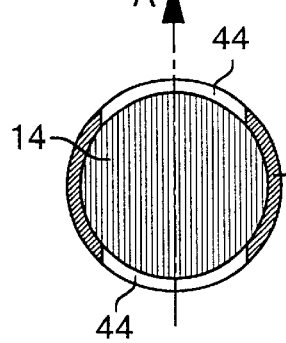

The example in FIG. 3 is similar to that of FIG. 2, except that the recesses 40 are replaced by openings 44 passing right through the thickness of the sleeve 26. Each opening can be formed by an elongated window extending over the greater part of the length of the magnet 14. However it also possible to provided a row of several openings 44 along each side of the rotor, as will be seen below.

Figure 4:
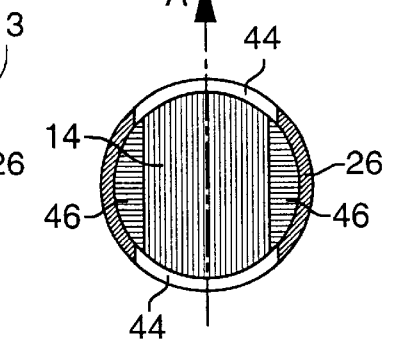

The rotor shown in FIG. 4 has substantially the same configuration as that of FIG. 3, except that the magnet 14 has two flat side surfaces on one side and the other of the axis of magnetisation A, along which are fitted metal segments of a cylinder, between the magnet 14 and the sleeve 26. These segments can be for example of soft iron, steel, copper or brass. They create a supplementary variation in the permeability of the rotor in relation to the magnetic flux of the stator, as a function of the angular position of the rotor relative to this flux.

Figure 5:
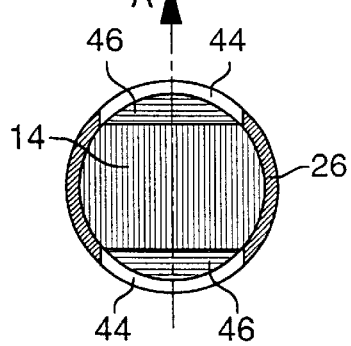

The configuration of FIG. 5 differs from that of FIG. 4 in that the segments 46 are placed between the magnet 14 and the openings 44 and thus face the poles of the magnet.

Figure 6:
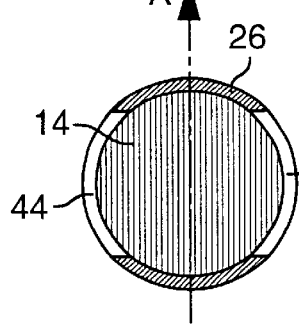
Figure 7:
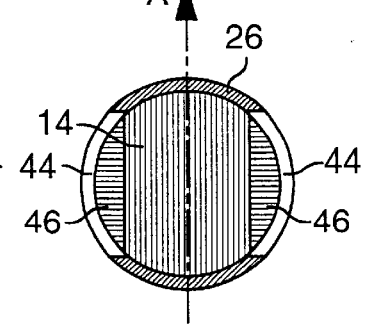
Figure 8:
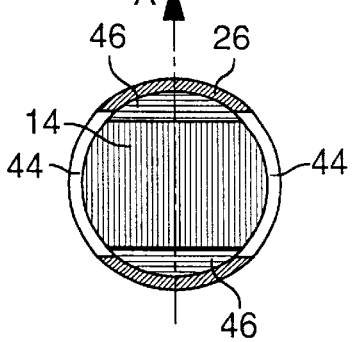

The examples of FIGS. 6 to 8 differ from those of FIGS. 3 to 5 respectively in that the openings 44 in the sleeve 26 are not located opposite the poles of the magnet 14 but at the sides, i.e. on one side and the other of the axis of magnetisation A. Thus it is the non-recessed parts of the sleeve 26 which cover the poles of the magnet.

The examples of FIGS. 9 and 10 correspond to those of FIGS. 7 and 8 with omission of the sleeve 26, that is to say that the magnetic circuit of the rotor essentially comprises the magnet 14 and the cylindrical segments 46. In the case of FIG. 9 the segments 46 are placed at the sides relative to the axis of magnetisation A, while they are placed facing the poles of the magnet in the case of FIG. 10. In both these cases reinforcement of the rotor can be contemplated by means of structural parts with no significant magnetic role, for example a jacket of resin or hoops cast into circular grooves so as not to extend beyond the periphery of the magnet 14 and of the segments 46, thus allowing the air gap to be reduced to a minimum.

The applicant has carried out some comparative tests to show the advantages given by the invention. FIGS. 11 to 13 schematically represent different configurations of the sheath 26 of some of the rotors 13 utilized on the tests. The magnets which were used were made from samarium-cobalt. In some specimens the magnet 14 had a cylindrical external shape and in other samples cylindrical segments 46 where joined to it as described above. The shaft 48 of the rotor passed through the magnet and was made of hardenable stainless steel.

In the configuration of FIG. 11, two openings 44 in the form of windows face the poles of the rotor in accordance with FIG. 3, i.e. such that they are symmetrical with one another relative to a plane perpendicular to the axis of magnetisation A. On the contrary, in the example of FIG. 12, two openings 44 in the form of windows are disposed at the sides as shown in FIG. 6, i.e. they are symmetrical with one another relative to a plane passing through the axis of magnetisation A. The example of FIG. 13 is like that of FIG. 11, except that it has two rows of circular openings 44 in place of the openings in the form of windows. A rotor with a cylindrical magnet 14 and a sleeve 26 of constant thickness was also tested, to provide a reference, and a variation of the frequency of resonance was measured which did not exceed 10%.

FIGS. 14 to 16 show the relative variation of frequency $\Delta f/f$ measured in the tests with nine samples of rotors numbered 1 to 9. The mean frequency f of the oscillatory circuits used was of the order or 1.7 MHz. $\Delta f$ is the difference between the maximum frequency and the minimum frequency measured for a sample during one revolution of the rotor at slow speed.

The results shown in FIG. 14 have been obtained with a configuration in conformity with FIGS. 3 and 11, with different angular extensions $\alpha$ of the windows 44. The value of $\alpha$ was 70° in sample 4, 90° in sample 5 and 110° in sample 6.

The results shown in FIG. 15 correspond to a configuration in accordance with FIGS. 6 and 12. The value of the angular extent $\alpha$ of the openings 44 was 110° in sample 1, 90° in sample 2 and 70° in sample 3. It is seen that the results are not so good as those in FIG. 14 but remain substantially better than those of the reference sample.

The results shown in FIG. 16 correspond to a configuration of the sleeve 26 according to FIG. 13. In the samples 7 and 8 the magnet is flanked by two metal segments 46 at the sides as seen in FIG. 4, these segments being of stainless steel in sample 7 and of brass in sample 8. In sample 9 the magnet has a cylindrical shape as shown in FIG. 3. It is noted that these three samples give good results but that the effect of the segments 46 is marginal.

As to the angular extension $\alpha$ of the openings 44 in the form of windows, FIGS. 14 and 15 show that the effectiveness, i.e. $\Delta f/f$, tends to increase with $\alpha$ but that a value of $\alpha$ substantially equal to 90° represents an optimum, given that the openings should not be too large in order not to reduce the mechanical strength of the sleeve 26 excessively.

What is claimed is:

1. A brushless electric machine comprising a stator with polyphase windings, a rotor having a permanent magnet means magnetised radially relative to the axis of the rotor and a non-magnetic structure at least partially surrounding said magnet means, and means for detecting the angular position of said rotor, said non-magnetic structure having zones of different thicknesses or of different permeabilities around the circumference of said magnet means, wherein said non-magnetic structure comprises a continuous, non-perforated metal sleeve having recesses which form thinned parts of the sleeve.

2. A machine according to claim 1, wherein said zones are disposed symmetrically relative to a plane perpendicular to the direction of magnetisation of the magnet means and passing through the axis of the rotor.

3. A machine according to claim 1, wherein said recesses are filled with a dielectric material.

4. A machine according to claim 1, wherein said recesses each have an angular extent lying between 70° and 110°.

5. A machine according to claim 4, wherein said angular extent is substantially equal to 90°.

6. A machine according to claim 1, wherein said sleeve is of brass.

7. A machine according to claim 1, wherein said magnet means has a cylindrical external shape.

8. A machine according to claim 1, wherein said magnet means has an external shape comprising two cylindrical surfaces symmetrical with one another, connected by two flat surfaces.

9. A machine according to claim 8, wherein each of said flat surfaces is covered by a metal segment of a cylinder.

10. A machine according to claim 1, wherein said magnet means has an anisotropic structure.

11. A machine according to claim 1, wherein said means for detecting the angular position of said rotor comprise measuring means arranged to be connected selectively to windings of said stator in such a manner as to form an oscillatory circuit and to detect variations in the frequency of resonance of said oscillatory circuit.

12. A brushless electric machine comprising a stator with polyphase windings, a rotor having a permanent magnet means magnetised radially relative to the axis of the rotor and a non-magnetic structure at least partially surrounding said magnet means, and means for detecting the angular position of said rotor, wherein said non-magnetic structure comprises a cylindrical metal sleeve surrounding said magnet means and having two axial rows of openings, said rows being diametrically opposite.

13. A machine according to claim 12, wherein said rows of openings are disposed symmetrically relative to a plane perpendicular to the direction of magnetisation of the magnet means and passing through the axis of the rotor.

14. A machine according to claim 12, wherein said openings are filled with a dielectric material.

15. A machine according to claim 12, wherein said sleeve is of brass.

16. A machine according to claim 12, wherein said magnet means has a cylindrical external shape.

17. A machine according to claim 12, wherein said magnet means has an external shape comprising two cylindrical surfaces symmetrical with one another, connected by two flat surfaces.

18. A machine according to claim 17, wherein each of said flat surfaces is covered by a metal segment of a cylinder.

19. A machine according to claim 12, wherein said magnet means has an anisotropic structure.

20. A machine according to claim 12, wherein said means for detecting the angular position of said rotor comprise measuring means arranged to be connected selectively to windings of said stator in such a manner as to form an oscillatory circuit and to detect variations in the frequency of resonance of said oscillatory circuit.

21. A brushless electric machine comprising a stator with polyphase windings, a rotor having a permanent magnet means magnetised radially relative to the axis of the rotor and a non-magnetic structure at least partially surrounding said magnet means, and means for detecting the angular position of said rotor, wherein said non-magnetic structure has zones of different thicknesses or of different permeabilities around the circumference of said magnet means, and wherein said non-magnetic structure comprises a metal sleeve having recesses which form openings or thinned parts of the sleeve and are filled with a dielectric material.

22. A machine according to claim 21, wherein said zones are disposed symmetrically relative to a plane perpendicular to the direction of magnetisation of the magnet means and passing through the axis of the rotor.

23. A machine according to claim 21, wherein said recesses are formed by two diametrically opposite windows.

24. A machine according to claim 21, wherein said recesses are formed by two axial rows of openings, said rows being diametrically opposite.

25. A machine according to claim 21, wherein said recesses each have an angular extent lying between 70° and 110°.

26. A machine according to claim 25, wherein said angular extent is substantially equal to 90°.

27. A machine according to claim 21, wherein said sleeve is of brass.

28. A machine according to claim 21, wherein said magnet means has a cylindrical external shape.

29. A machine according to claim 21, wherein said magnet means has an external shape comprising two cylindrical surfaces symmetrical with one another, connected by two flat surfaces.

30. A machine according to claim 29, wherein each of said flat surfaces is covered by a metal segment of a cylinder.

31. A machine according to claim 21, wherein said magnet means has an anisotropic structure.

32. A machine according to claim 21, wherein said means for detecting the angular position of said rotor comprise measuring means arranged to be connected selectively to windings of said stator in such a manner as to form an oscillatory circuit and to detect variations in the frequency of resonance of said oscillatory circuit.

33. A brushless electric machine comprising a stator with polyphase windings, a rotor having a permanent magnet means magnetised radially relative to the axis of the rotor and a non-magnetic structure at least partially surrounding said magnet means, and means for detecting the angular position of said rotor, wherein said non-magnetic structure has zones of different thicknesses or of different permeabilities around the circumference of said magnet means, and wherein said means for detecting the angular position of said rotor comprise measuring means arranged to be connected selectively to windings of said stator in such a manner as to form an oscillatory circuit and to detect variations in the frequency of resonance of said oscillatory circuit.

34. A brushless electric machine comprising a stator with polyphase windings, a rotor having a permanent magnet means magnetised radially relative to the axis of the rotor and a non-magnetic structure at least partially surrounding said magnet means, and means for detecting the angular position of said rotor, said non-magnetic structure having zones of different thicknesses or of different permeabilities around the circumference of said magnet means, and wherein said magnet means has an external shape comprising two cylindrical surfaces symmetrical with one another, connected by two flat surfaces.

35. A machine according to claim 34, wherein each of said flat surfaces is covered by a metal segment of a cylinder.

* * * * *